United States Patent [19]

Omura et al.

[11] Patent Number: 5,727,511
[45] Date of Patent: Mar. 17, 1998

[54] CYLINDER LINER AND CYLINDER BLOCK AND METHOD FOR PRODUCING THE CYLINDER LINER AND THE CYLINDER BLOCK

[75] Inventors: Hiroyuki Omura; Shin Nitta; Yosuke Takahashi; Hirotake Usui, all of Chiyoda-ku; Jun Isomoto; Haruhisa Mori, both of Minato-ku; Takashi Yamaguchi; Hiroshi Miyazaki, both of Joetsu, all of Japan

[73] Assignees: Ryobi Ltd., Hiroshima-Ken; Mitsubishi Jidosha Kogyo Kabushiki Kaisha, Tokyo, both of Japan

[21] Appl. No.: 636,221

[22] Filed: Apr. 23, 1996

[30] Foreign Application Priority Data

Apr. 26, 1995 [JP] Japan ................... 7-126008

[51] Int. Cl.$^6$ .............. B22D 19/08; B22D 19/14; C22C 1/09
[52] U.S. Cl. .............................. 123/193.2
[58] Field of Search .................. 123/193.2, 668; 29/888.06, 888.061

[56] References Cited

U.S. PATENT DOCUMENTS

| | | | |
|---|---|---|---|
| 4,757,790 | 7/1988 | Ushio et al. | 123/193.2 |
| 4,856,462 | 8/1989 | Ushio et al. | 123/193.2 |
| 4,959,276 | 9/1990 | Hagiwara et al. | 123/193.2 |
| 4,986,230 | 1/1991 | Panyard et al. | 123/193.2 |
| 5,131,356 | 7/1992 | Sick et al. | 123/193.2 |
| 5,183,025 | 2/1993 | Jorstad et al. | 123/193.2 |

*Primary Examiner*—Marguerite McMahon
*Attorney, Agent, or Firm*—Sughrue, Mion, Zinn, Macpeak & Seas, PLLC

[57] ABSTRACT

A cylinder liner or a cylinder block's bore portion formed of a composite alloy material reinforced with fibers and dispersed with ceramic particles. In the cylinder liner or the bore portion of the cylinder block, ceramic particles and alumina short fibers are uniformly dispersed in a light metal matrix. For producing the cylinder liner and the cylinder block, a preform having a shape identical with the cylinder liner or the bore portion is produced by mixing together the ceramic particles and the alumina short fibers. Molten light metal is infiltrated into voids of the preform during casting.

19 Claims, 4 Drawing Sheets

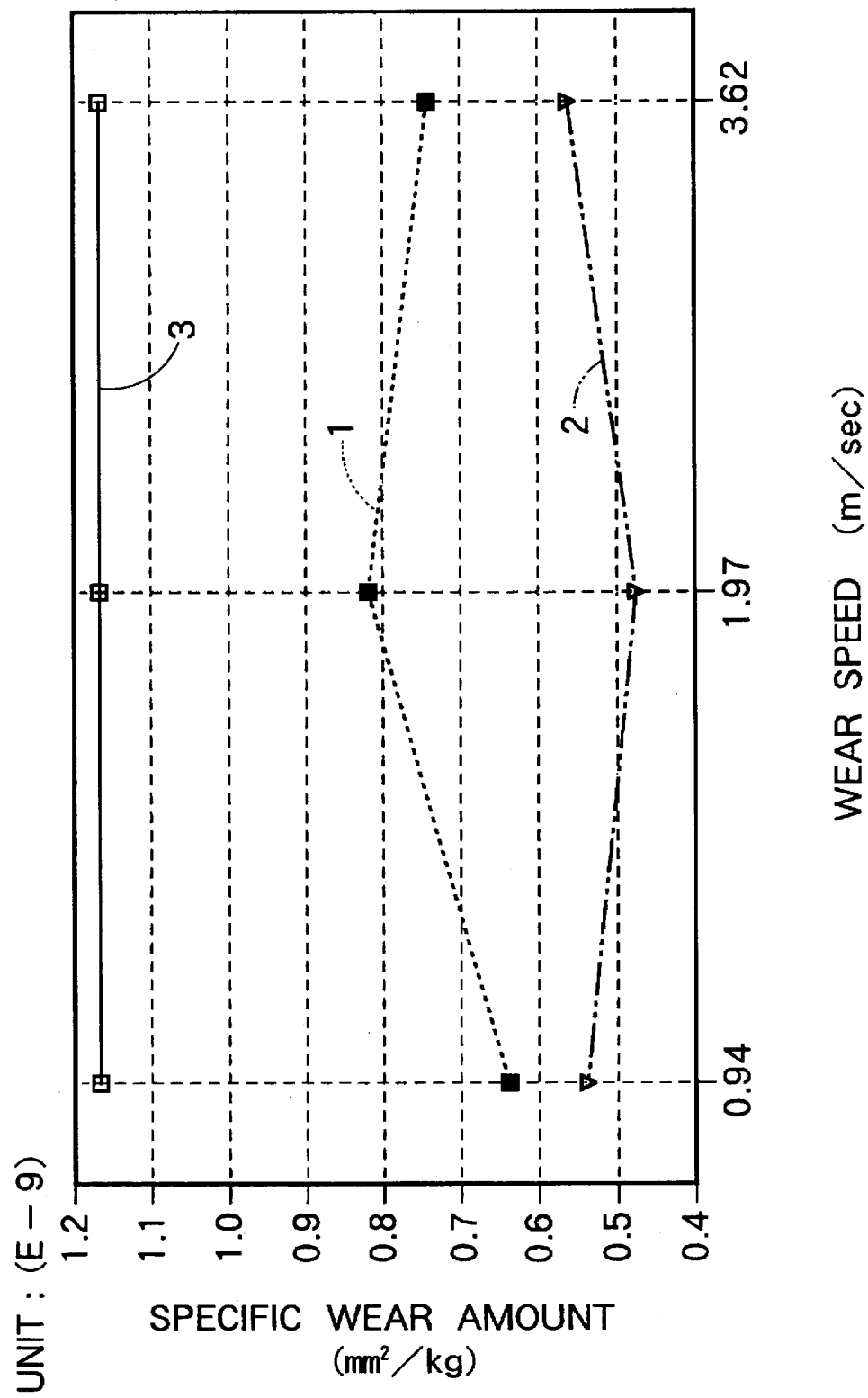

CYLINDER LINER AND CYLINDER BLOCK AND METHOD FOR PRODUCING THE CYLINDER LINER AND THE CYLINDER BLOCK

BACKGROUND OF THE INVENTION

The present invention relates to a cylinder liner and a cylinder block and a method for producing the cylinder liner and the cylinder block. More particularly, the invention relates to such cylinder liner and cylinder block and method for producing these in which the cylinder liner itself or a cylinder bore portion in the cylinder block is made of a composite material reinforced with reinforcing fibers and dispersed with rigid particles. The present invention further relates to a preform for the cylinder liner and a bore portion of the cylinder block.

A cylinder liner and a cylinder block for use in an internal combustion engine must provide high strength, high rigidity, and high dimensional stability and must exhibit sufficient sliding characteristic with respect to an opponent sliding member such as a piston ring and a piston. To this effect, a conventional cylinder block is formed of a cast iron. However, to cope with the requirement of reduction in weight, a cylinder block has been proposed in which a portion is formed of aluminum alloy and the cylinder liner is formed of a cast iron taking a sliding characteristic into consideration. Alternatively, an entire cylinder block is formed of a hyper-eutectic aluminum-silicon alloy.

Japanese Patent Application Kokai No. SHO 62-187562 discloses a fiber-reinforced cylinder block in which a preform having a shape of the cylinder block is formed by a fiber mixture containing carbon fibers and alumina fibers. A cast iron sleeve is inserted into an inner peripheral surface of the preform, and these are set in a casting machine. During casting, molten aluminum alloy is filled in the preform, so that the portion surrounding the cylinder bore is formed by the fiber-reinforced composite material.

In order to improve the sliding characteristic of a light metal alloy in the cylinder bore portion to a level equal to or higher than that of the cast iron, a composite material with aluminum alloy matrix is used. For example, Japanese Patent Publication No. HEI 3-71939 discloses a sliding member made of aluminum alloy where the sliding portion is reinforced with the reinforcing fibers such as alumina fibers and carbon fibers.

By producing a sleeveless engine block with the hyper eutectic aluminum-silicon alloy, heat conductivity of the engine block can be improved, and effective thickness of the aluminum between neighboring cylinder bores can be increased to enhance casting performance. Therefore, a compact and light weight engine block can be produced. However, it would be difficult to control a grain size of pro-eutectic silicon, to thus degrade productivity, and further, machinability of a resultant engine block is lowered. Furthermore, sliding characteristic of the aluminum-silicon alloy is inferior to that of the cast iron. Therefore, this aluminum-silicon alloy is not sufficiently available for providing a cylinder bore portion.

Further, in the conventional fiber-reinforced composite material, the molten metal may be solidified during filling process into the preform, to deteriorate filling of the molten metal. Moreover, deformation, crack generation or bending may occur in the preform, and sufficient molten metal filling thereinto may not be attained. Such product is not available for the sliding portion. In case carbon fibers are used, the fibers may be easily reacted at high temperature in compound process with the aluminum alloy. During the compounding process, a brittle carbide layer may be generated at a boundary between the aluminum alloy and the carbon fibers, thereby lowering mechanical strength such as impact resistance.

Further, in case of an aluminum alloy matrix-type composite material in which SiC particles and $Al_2O_3$ particles are dispersed in the aluminum alloy, aggregation of particles may occur during compounding process. Therefore, uniform distribution of particles in the matrix is not provided, and attacking power against opponent member is increased even though wear resistance as a bore material is improved. Accordingly, if such material is used as the liner material, a piston ring and a piston are excessively worn.

SUMMARY OF THE INVENTION

It is therefore, an object of the present invention to provide an improved cylinder liner and a cylinder block and improved method for producing these in which the cylinder liner itself or a cylinder bore portion in the cylinder block is made of a composite material reinforced with reinforcing fibers and dispersed with ceramic particles.

Another object of the present invention is to provide such products and method in which no deformation occurs in a preform after infiltration of a metal matrix, and the reinforcing fibers and the ceramic particles can be uniformly distributed in the matrix metal.

Still another object of the present invention is to provide such cylinder liner and the cylinder block on which high dimensions accuracy, high strength, high rigidity and high sliding characteristic are imparted.

These and other objects of the present invention will be attained by providing a cylinder liner formed of a reinforced composite material in which ceramic particles and alumina short fibers are dispersed in a matrix of a light metal.

In another aspect of the invention there is provided a cylinder block including a block portion formed of a light metal and a bore portion formed in the block portion and in sliding relation with a piston ring and a piston, the cylinder block comprising the bore portion formed of a composite material reinforced with alumina short fibers in which ceramic particles are dispersed in a matrix of a light metal.

In still another aspect of the invention, there is provided a preform having a shape identical with a cylinder liner or a bore portion of a cylinder block, the preform comprising a mixture of alumina short fibers and ceramic particles, the mixture providing voids into which a molten light metal are to be infiltrated for providing a composite material reinforced with the alumina short fibers and dispersed with the ceramic particles.

In still another aspect of the invention, there is provided a method for producing a cylinder liner comprising the steps of forming a preform for a cylinder liner by mixing ceramic particles with short fibers whose principal component are alumina short fibers, and casting a cylinder liner by setting the preform in a metal mold for the cylinder liner and filling light metal into the metal mold such that the light metal is infiltrated as a matrix into voids of the preform to provide a composite material reinforced with alumina short fibers in which the ceramic particles are dispersed in the matrix.

In still another aspect of the invention, there is provided a method for producing a cylinder block comprising the steps of casting a block portion with a light metal, forming a preform for a cylinder liner by mixing ceramic particles with short fibers whose principal component are alumina short fibers, casting a cylinder liner by setting the preform in a metal mold for the cylinder liner and filling a light metal into the metal mold such that the light metal is infiltrated as a matrix into voids of the preform to provide a composite material reinforced with alumina short fibers in which the ceramic particles are dispersed in the matrix, the light metal of the cylinder liner being identical with or different from the light metal of the block portion, and force-fitting the casted cylinder liner into the casted block portion.

In still another aspect of the invention, there is provided a method for producing a cylinder block comprising the steps of forming a preform for a cylinder liner by mixing ceramic particles with short fibers whose principal component are alumina short fibers, casting a cylinder liner by setting the preform in a metal mold for the cylinder liner and filling a light metal into the metal mold such that the light metal is infiltrated as a matrix into voids of the preform to provide a composite material reinforced with alumina short fibers in which the ceramic particles are dispersed in the matrix, setting the casted cylinder liner into a portion of a metal mold for a block portion of the cylinder block, the portion of the metal mold corresponding to a bore portion of the block portion, and casting a block portion integrally with the already set cylinder liner by filling a light metal into the metal mold for the block portion, the light metal for the block portion being identical with or different from the light metal of the cylinder liner.

In still another aspect of the invention, there is provided a method for producing a cylinder block comprising the steps of forming a preform for a portion corresponding to a bore portion of the cylinder block by mixing ceramic particles with short fibers whose principal component are alumina short fibers, setting the preform into a portion of a metal mold for a block portion of the cylinder block, the portion of the metal mold corresponding to the bore portion, and casting the bore portion concurrently with the casting of the block portion by filling a light metal into the metal mold for the block portion. The light metal is infiltrated as a matrix into voids of the preform set in the metal mold to provide the bore portion made of a composite material reinforced with alumina short fibers in which the ceramic particles are dispersed in the matrix. The block portion is casted with the light metal integrally with the bore portion.

In the cylinder liner and the cylinder block according to the present invention, reinforcing material in the composite material is the mixture of the alumina short fibers and the ceramic particles. Therefore, excellent wear resistance can be obtained while reducing the attacking power against the opponent member. If hollow ceramic particles are used, the hollow portions serve as lubrication oil retainers, to further improve sliding characteristic.

Further, by the employment of the particles, volumetric percentage of the alumina short fibers can be reduced, to lower the attacking power against the opponent member.

Further, the preform according to the present invention provides a skeleton structure having high strength and high rigidity because of synergetic effect by the alumina short fibers and the ceramic particles. Therefore, in the compound process, no deformation occurs in the preform to provide high dimensional accuracy of a resultant product. Further, the skeleton structure can maintain voids therebetween, so that molten metal can be easily infiltrated into the void, to thus provide a homogeneous product.

Further, in the method for producing the cylinder liner and the cylinder block according to the present invention, the ceramic particles are uniformly dispersed in the preform, and relative positional relationship between the ceramic particles and the alumina short fibers can be maintained unchanged because of the interaction therebetween. Accordingly, aggregation of the particles, which may deteriorate mechanical strength, during compounding process does not occur. Thus, homogeneous sliding parts can be provided. That is, because the preform includes ceramic particles as well as alumina short fibers, appropriate voids can be provided in the preform to facilitate infiltrating function of the molten metal into the voids, and the preform does not largely undergo deformation even after the infiltration because of the rigid skeleton structure of the preform.

DETAILED DESCRIPTION OF THE PREFERRED EMBODIMENTS

Figure 1:
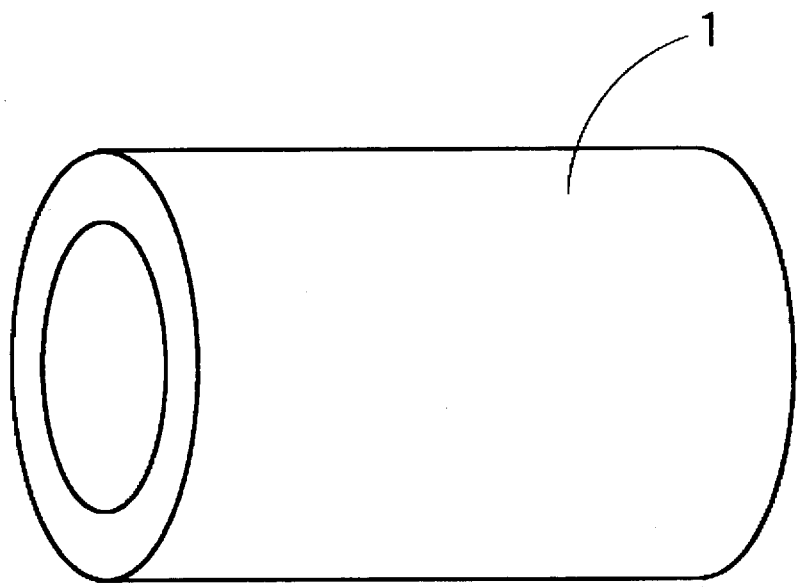
FIG. 1 is a perspective view showing a preform of a cylinder liner according to a first embodiment of the present invention.

A cylinder liner and a method for producing the cylinder liner according to one embodiment of the present invention will be described with reference to FIG. 1. The cylinder liner 1 is formed of a composite material reinforced with alumina short fibers and dispersed with ceramic particles. Matrix is made from a light metal such as aluminum, aluminum alloy, magnesium, and magnesium alloy. ADC12, ADC10, AC8A and AC4CH are available as aluminum alloy. In the matrix, ceramic particles and the alumina short fibers are uniformly distributed.

As the material of the ceramic particles, are available carbon powders, graphite powders, metal oxide or carbide of Al, Si, Ti, Zr, Mg, B, Fe, such as for example, $SiO_2$, SiC, $TiO_2$, and $Fe_2O_3$ powders, and metal nitride powders. Preferred particles are alumina ($Al_2O_3$), mullite ($3Al_2O_3 \cdot 2SiO_2$), silica-alumina($Al_2O_3/SiO_2$=50/50–95/5), silica ($SiO_2$). Grain size should be not more than 100 microns, and preferably, not more than 60 microns. Further, silica-alumina and the silica are preferably of hollow spherical shape.

The alumina short fibers are made from a material whose principal component is alumina, such as alumina ($Al_2O_3$), mullite ($3Al_2O_3 \cdot 2SiO_2$), and silica-alumina($Al_2O_3/SiO_2=$ 50/50–95/5). The short fibers have length of not more than 1 mm, preferably, not more than 0.8 mm, and diameter of not more than 50 microns, preferably, not more than 30 microns.

A preform is provided by the ceramic particles and alumina short fibers those being as principal components. More specifically, a mixture of alumina short fibers, silica spheres, mullite particles and inorganic binders such as silica-sol are subjected to dispersion, filtration, pressing, drying and burning to provide a preform. Then, molten light metal is infiltrated into the voids of the preform. For example, in case of the cylinder liner 1 according to the first embodiment shown in FIG. 1, a preform having a shape identical with that of FIG. 1 is provided, and the preform is set in a mold cavity for the cylinder liner. A core is inserted into the preform, and a molten light metal is filled into the metal mold by die-casting method. Thus, molten light metal is uniformly infiltrated into the voids of the preform. Regarding die-casting condition, the preform preheating temperature is in a range of from room temperature to 500° C., molten metal temperature is from 680° C. to 770° C., metal mold temperature is in a range of from 150° C. to 300° C., injection speed is from 0.1 to 1.0 m/s, and casting pressure is from 250 to 700 kg/cm².

Content of sum of ceramic particles and the short fibers in the resultant composite material after infiltration with the light metal is from 9 to 50% by volume. If the content is less than 9% by volume, predetermined reinforcing effect cannot be obtained. On the other hand, if the content exceeds 50% by volume, sufficient infiltration of the molten metal into the voids cannot be achieved.

The casted liner is force-fitted with a bore portion of a cylinder block made of a light metal which is identical with or different from the material of the matrix metal of the liner. Alternatively, when casting a cylinder block with the light metal which is identical with or different from the matrix material of the liner, the casted liner made of the above described composite material reinforced with the alumina short fibers and dispersed with particles is set in the metal mold for the cylinder block, so as to be integrally with the cylinder block during casting thereof.

A second embodiment of the present invention will next be described. In the second embodiment, the liner is not solely casted but is casted concurrently with the casting of the cylinder block. That is, at the time of casting the cylinder block, the above described hollow cylindrical preform is set in a metal mold for the cylinder block at a portion corresponding to a bore portion of the cylinder block. Then, the molten aluminum alloy is introduced into the metal mold. In this way, the block portion of the cylinder block is casted, and at the same time, the molten aluminum alloy is uniformly infiltrated into the voids of the preform which has been set at the portion corresponding to the bore portion of the cylinder block. Thus, the bore portion is made from the composite material reinforced with alumina short fibers and dispersed with the ceramic particles. Incidentally, regarding the casting condition of the cylinder block, the preform preheating temperature is in a range of from room temperature to 500° C., molten metal temperature is from 680° C. to 770° C., metal mold temperature is in a range of from 150° C. to 300° C., injection speed is from 0.1 to 1.0 m/s, and casting pressure is from 250 to 700 kg/cm². In the second embodiment, the material of the block portion and the matrix material of the bore portion are apparently the same.

Figure 2:
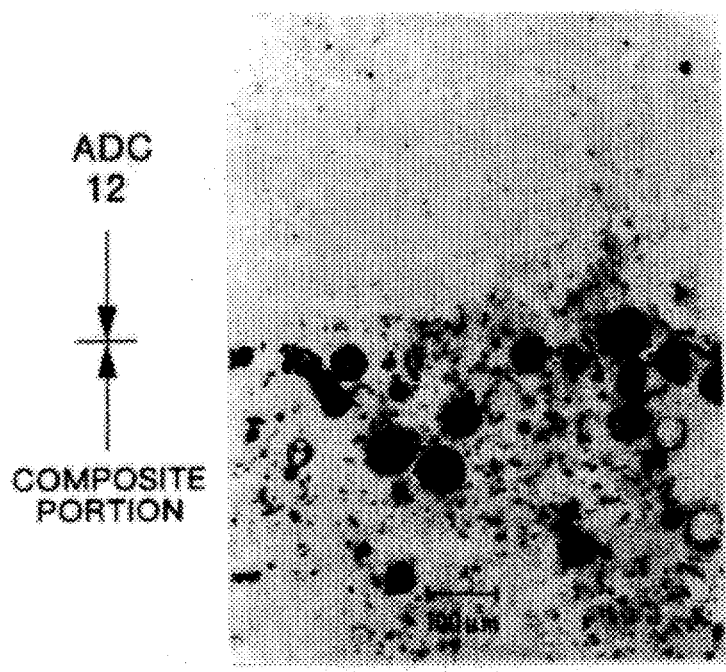
FIG. 2(a) is a microscopic photograph, with magnification of 100 times, showing a metal structure at a portion adjacent a boundary between a matrix portion and a compound portion of a composite material used in the cylinder liner according to the embodiment in which ADC12 alloy is compounded with the preform mainly made of hollow $SiO_2$ particles and alumina short fibers.
FIG. 2(b) is a microscopic photograph, with magnification of 100 times, showing a metal structure at a compound portion of the composite material of FIG. 2(a)
Figure 2:
Figure 3:
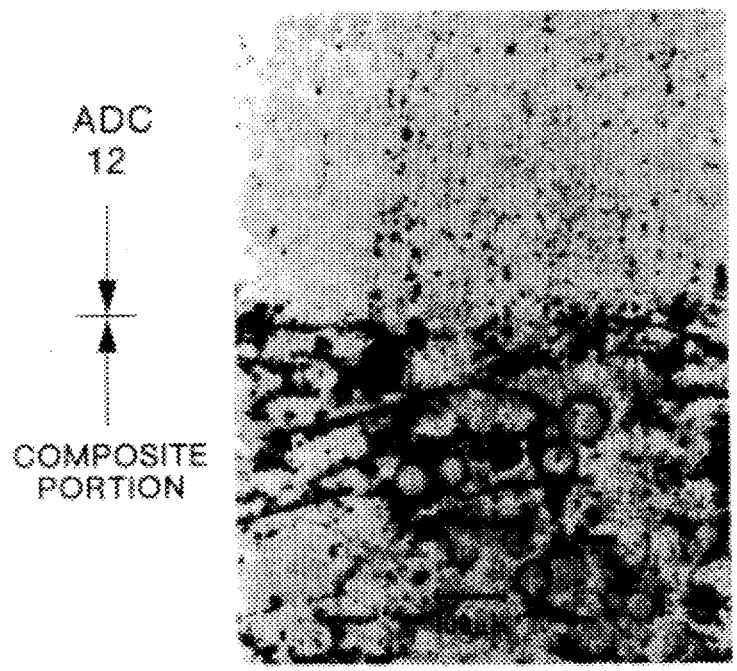
FIG. 3(a) is a microscopic photograph, with magnification of 100 times, showing a metal structure at a portion adjacent a boundary between a matrix portion and a compound portion of a composite material used in the cylinder liner according to the present embodiment in which ADC12 alloy is compounded with the preform mainly made of hollow $SiO_2$ particles, mullite particles and alumina short fibers.
FIG. 3(b) is a microscopic photograph, with magnification of 100 times, showing a metal structure at a compound portion of the composite material of FIG. 3(a); and, FIG. 4 is a graph showing a wear characteristic of a sliding member according to the embodiment.
Figure 3:
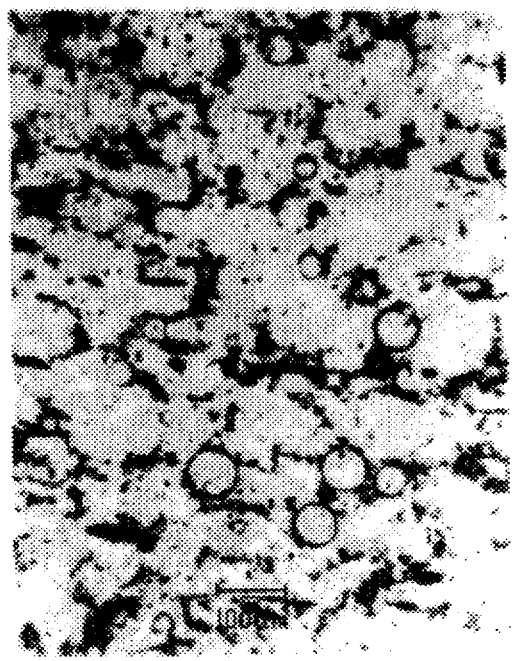

FIG. 2 is a photograph showing a metal structure at the cylinder liner produced by infiltrating ADC12 matrix alloy into a hybrid preform made up of the alumina short fibers and hollow $SiO_2$ spheres, and FIG. 3 is a photograph showing a metal structure at the cylinder liner produced by infiltrating ADC12 matrix alloy into a hybrid preform made up of the alumina short fibers, hollow $SiO_2$ spheres and mullite particles. In FIG. 2, line portions indicate the alumina short fibers and a black circular spots indicate the hollow $SiO_2$ spheres. Further, in FIG. 3, the minute points indicate mullite particles, line portions indicate the alumina short fibers, and a black circular spots indicate the hollow $SiO_2$ spheres. A composite portion indicates a preform portion to which the ADC12 matrix alloy is filled. The preform is formed in the following manner.

First, unbinding or fraying was performed by putting alumina short fibers ($Al_2O_3:SiO_2=72:28$ (weight ratio) and 500 parts by weight of water into a dissolver. Then, 200 parts by weight of acetic alumina-sol whose solid content was 10% by weight was added to the mixture, and the mixture was subjected to agitation under wet condition. The mixture was poured into a cylindrical metal mold and liquid content was removed from upper and lower surfaces to thereby obtain a compact. The compact was dried for 10 hours at the temperature of 105° C. in a drying machine, and was burned for 3 hours at 1200° C. to obtain a preform where the alumina short fibers and the hollow $SiO_2$ spheres are uniformly dispersed and the alumina short fibers were fixed stationarily by skeleton function of the hollow $SiO_2$ particles. The synergetic effect brought by the combination of the alumina short fibers and the hollow $SiO_2$ particles can enhance strength and rigidity of the preform.

Then, aluminum alloy (ADC12 alloy) was infiltrated into the preform. Regarding the casting condition the preform preheating temperature was in a range of from room temperature to 500° C., molten metal temperature was from 680° C. to 770° C., metal mold temperature was in a range of from 150° C. to 300° C., injection speed was from 0.1 to 1.0 m/s, and casting pressure was from 250 to 700 kg/cm².

In both cases shown in FIGS. 2 and 3, sufficient infiltration of the molten metal into the preform resulted, because the particles contained in the preform can maintain the voids, so that the molten metal can be easily entered into the voids.

Next, Oogoshi's wear test was conducted in order to investigate the sliding characteristic of the composite material reinforced with the alumina short fibers and dispersed with ceramic particles. Samples 1, 2, and 3 were prepared. The sample 1 was a composite material shown in FIG. 2 in accordance with the present invention in which alumina short fibers and hollow $SiO_2$ spheres co-existed. The sample 2 was a composite material shown in FIG. 3 in accordance with the present invention in which alumina short fibers, hollow $SiO_2$ spheres and mullite particles co-existed. In either cases, matrix alloy was ADC12. The sample 3 was a comparative sample formed of B390 alloy. Opponent sliding member was formed of cast iron (FC25), and wear amount of the respective samples were measured in the following sliding condition:

lubrication oil: SAE10W40
load: 19.9 kgf
sliding distance: 400 m

In FIG. 4, the wear speed indicates sliding speed of the opponent member. Further, specific wear amount indicates wear characteristic against the opponent sliding member. Provided that Ws is the specific wear amount, the following equation is provided:

$$Ws = A \cdot Wo / Po \cdot Lo$$

where A: constant (about 1.5),

Wo: wear amount,

Po: final load

Lo: sliding distance.

Judging from the wear amount test shown in FIG. 4, the samples 1 and 2 according to the present invention exhibited superior wear resistance to that of the comparative sample 3.

Further, after wear amount test, the samples 1, 2 and 3 were subjected to electron probe microanalysis. As a result of the EPMA, Fe particles released from the opponent sliding members were adhered onto the sliding surface of the sample 3. On the other hand, adhesion of Fe particles was not acknowledged at the sliding surfaces of the samples 1 and 2. Consequently, the samples according to the present invention provided low attacking power against the opponent member. This is due to the fact that since the composite material contains hollow $SiO_2$ particles, the hollow portions can retain lubrication oil to improve sliding characteristic. Further, since mullite is added in the sample 2, wear resistance can be improved without increasing attacking power against the opponent sliding member.

What is claimed is:

1. A cylinder block, comprising:

a block portion formed of a light metal and a bore portion formed in the block portion and in sliding relation with a piston ring and a piston, the bore portion formed of a composite material comprised of a matrix of a light metal which is reinforced with alumina short fibers and hollow spherical silica particles.

2. The cylinder block as claimed in claim 1, wherein said light metal of said bore portion is identical with said light metal forming said block portion.

3. The cylinder block as claimed in claim 1, wherein said light metal of said bore portion is different from said light metal forming said block portion.

4. The cylinder block as claimed in claim 1, further comprising mullite particles dispersed in said matrix.

5. The cylinder block as claimed in claim 1, wherein said hollow spherical silica particles have grain size not more than 60 microns.

6. The cylinder block as claimed in claim 1, wherein the alumina short fibers comprise a material selected from the group consisting of alumina, mullite and silica-alumina.

7. The cylinder block as claimed in claim 1, wherein the alumina short fibers have a length of not more than 0.8 mm, and a diameter of not more than 30 microns.

8. The cylinder block as claimed in claim 1, wherein the sum of said hollow spherical silica particles and said alumina short fibers is from 9 to 50% by volume of a composite material.

9. The cylinder block as claimed in claim 1, wherein the bore portion comprises a cylinder liner provided as a separate piece from the block portion.

10. The cylinder block as claimed in claim 9, wherein the cylinder liner is force-fitted into the block portion.

11. The cylinder block as claimed in claim 9, wherein the cylinder liner is integrally casted with the block portion.

12. The cylinder block as claimed in claim 9, wherein the cylinder liner comprises a preform and the light metal, the preform comprising a mixture of the alumna short fibers and the hollow spherical silica particles.

13. The cylinder block as claimed in claim 12, wherein the preform has a shape identical with the cylinder liner, the mixture providing voids into which a molten light metal are infiltrated for providing the composite material.

14. The cylinder block as claimed in claim 1, wherein said bore portion comprises a preform and said light metal, said preform comprising, a mixture of said alumina short fibers and said hollow spherical silica particles.

15. The preform as claimed in claim 9, further comprising mullite particles mixed with said alumina short fibers and said hollow spherical silica particles.

16. The preform as claimed in claim 15, said hollow spherical silica particles have a grain size not more than 60 microns.

17. The cylinder block as claimed in claim 9, wherein said alumina short fibers comprise a material selected from the group consisting of alumina, mullite and silica-alumina.

18. The cylinder block as claimed in claim 16, wherein said alumina short fibers have respective lengths not more than 0.8 mm, and respective diameters of nor more than 30 microns.

19. The cylinder block as claimed in claim 4, wherein the sum of said hollow spherical silica particles and said alumina short fibers is from 9 to 50% by volume of a composite material.

* * * * *